(12) United States Patent
Chen et al.

(10) Patent No.: US 7,234,676 B2
(45) Date of Patent: Jun. 26, 2007

(54) ELEVATING MODULE

(75) Inventors: Shou-Chih Chen, Miao-Li County (TW); Sea-Huang Lee, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 38 days.

(21) Appl. No.: 11/306,159

(22) Filed: Dec. 19, 2005

(65) Prior Publication Data
US 2006/0208241 A1    Sep. 21, 2006

(30) Foreign Application Priority Data
Feb. 15, 2005    (TW) .............................. 94104273 A

(51) Int. Cl.
*F16M 9/00*    (2006.01)

(52) U.S. Cl. ................................... 248/677; 248/188.2

(58) Field of Classification Search ............ 248/188.2, 248/188.3, 188.5, 188.8, 677; 254/11
See application file for complete search history.

(56) References Cited

U.S. PATENT DOCUMENTS

| 6,715,890 B2 * | 4/2004 | Huang et al. ................ 353/119 |
| 6,729,590 B2 * | 5/2004 | Gabriel .................... 248/188.2 |
| 2006/0113440 A1 * | 6/2006 | Chung et al. ............ 248/188.2 |
| 2006/0169853 A1 * | 8/2006 | Lin et al. .................. 248/188.2 |

\* cited by examiner

*Primary Examiner*—Ramon O Ramirez
(74) *Attorney, Agent, or Firm*—Jiang Chyun IP Office

(57) ABSTRACT

An elevating module for a projection apparatus is provided. The elevating module includes a base, a movable leg, a first elastomer, a decelerating module and a fixing component. The base is connected to the projection apparatus and has a slide way, an accommodating space and an opening. The accommodating space is disposed in the base and connected to the opening disposed at one end of the base. The slide way is disposed on one sidewall of the base and connected to the accommodating space. The movable leg penetrates the opening of the base and accommodates within the accommodating space. The first elastomer is connected to the base and the movable leg that can protrude from the opening of the base through the first elastomer. The deceleration module is disposed on the base and connected the movable leg. The fixing component is fixing the base to the movable leg.

12 Claims, 4 Drawing Sheets

US 7,234,676 B2

ELEVATING MODULE

CROSS-REFERENCE TO RELATED APPLICATION

This application claims the priority benefit of Taiwan application serial no. 94104273, filed on Feb. 15, 2005. All disclosure of the Taiwan application is incorporated herein by reference.

BACKGROUND OF THE INVENTION

1. Field of the Invention

The present invention relates to an elevating module. More particularly, the present invention relates to an elevating module for a projection apparatus.

2. Description of the Related Art

FIG. 1 is a schematic view showing a conventional projection apparatus 50 for projecting an image on a screen 80. Referring to FIG. 1, an elevating module 100 is often utilized to adjust a position of the image projected from the projection apparatus 50. Through the elevating module 100, an elevation angle θ of the projection apparatus 50 can be adjusted to a suitable level for projecting the image onto the screen 80.

FIG. 2 is an explosion view showing major components of the conventional elevation module. As shown in FIG. 2, the conventional elevating module 100 comprises a base 110, a movable leg 120, a spring 130, a fixing component 140 and a pad 150. The fixing component 140 further includes a button 142. The base 110 is connected to the projection apparatus 50 (shown in FIG. 1) and the movable leg 120 is disposed in the base 110. Furthermore, the spring 130 is disposed between the base 110 and the movable leg 120. The fixing component 140 has a positioning section (not shown) for inserting into a positioning groove 122 of the movable leg 120 so that the movable leg 120 can be fixed. In addition, the pad 150 is connected with one end of the movable leg 120.

In the conventional elevating module 100, when a user pushes the button 142 of the fixing component 140, the positioning section of the fixing component 140 is detached from the positioning groove 122 of the movable leg 120. Hence, the spring 130 provides an elastic force necessary for ejecting the movable leg 120 from the base 110. Thereafter, the user releases the button 142 to fix the movable leg 120 through the fixing component 140. Thus, the elevation angle θ of the projection apparatus 50 can be adjusted.

Because the spring 130 provides the elastic force for ejecting the movable leg 120 from the base 110 quickly, a strong impact between the movable leg 120 and the base 110 creates a burst of noise that causes some unpleasant feeling to the user. Moreover, the impacts between the movable leg 120 and the base 110 damage the elevating module 100. Furthermore, adjusting a length of an extension of the movable leg 120 by the user is difficult and inconvenient because the movable leg 120 ejects from the base 110 quickly. In addition, a larger gap is disposed between the movable leg 120 and an interior wall of the base 110 to cause a wobbling of the movable leg 120 during ejecting. Thus, the user thinks the conventional projection apparatus 50 without quality.

SUMMARY OF THE INVENTION

The present invention provides an elevating module having a movable leg that can eject from a base slowly and stably so that a user can easily control a length of an extension of the movable leg from the base.

The present invention provides an elevating module that can reduce noise when adjusting a movable leg.

The present invention provides an elevating module having a movable leg that can avoid a wobbling of the movable leg.

An elevating module for a projection apparatus is provided. The elevating module includes a base, a movable leg, a first elastomer, a decelerating module and a fixing component. The base connected to the projection apparatus, which has a slide way, an accommodating space, and an opening. The accommodating space is disposed in the base and connected to the opening located at one end of the base. The slide way is disposed on one sidewall of the base and connected to the accommodating space. The movable leg penetrates the opening of the base and accommodates within the accommodating space. The first elastomer is disposed between the base and the movable leg that protrudes from the opening of the base through the first elastomer. The deceleration module is disposed on the base for contacting with the base. The fixing component is for fixing the base to the movable leg.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
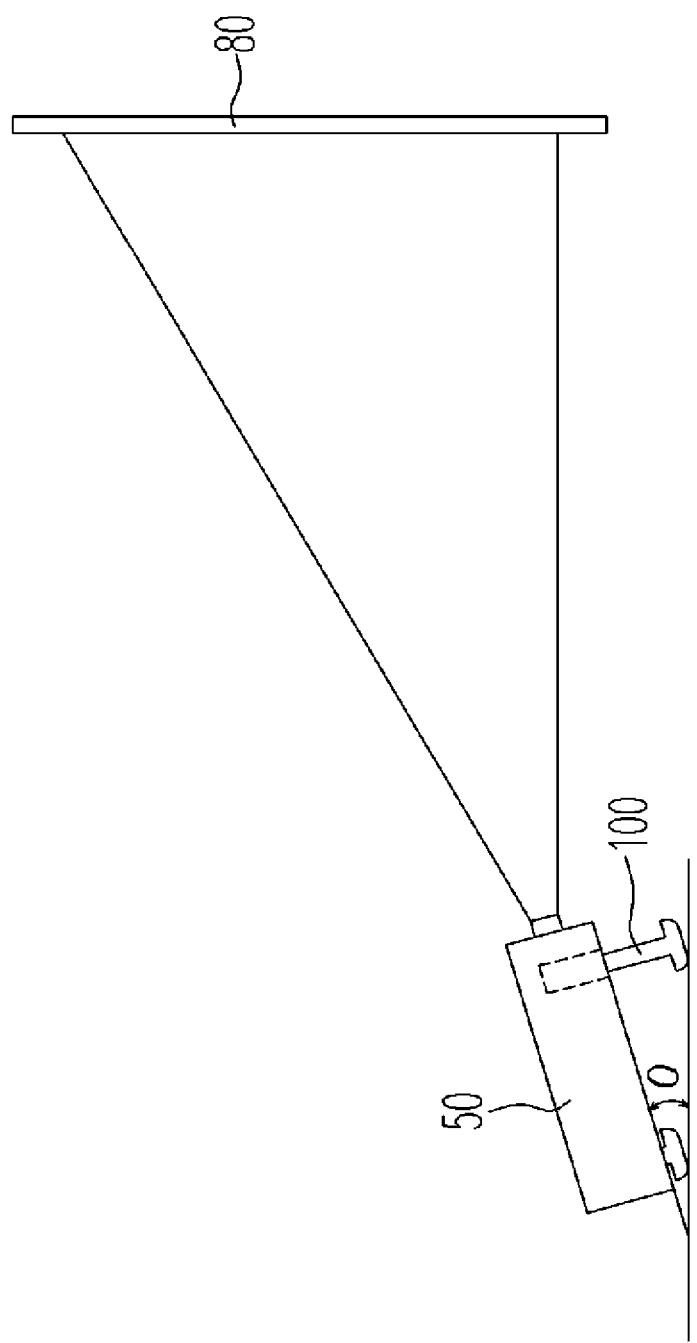
FIG. 1 is a schematic view showing a conventional projection apparatus for projecting an image on a screen.
Figure 2:
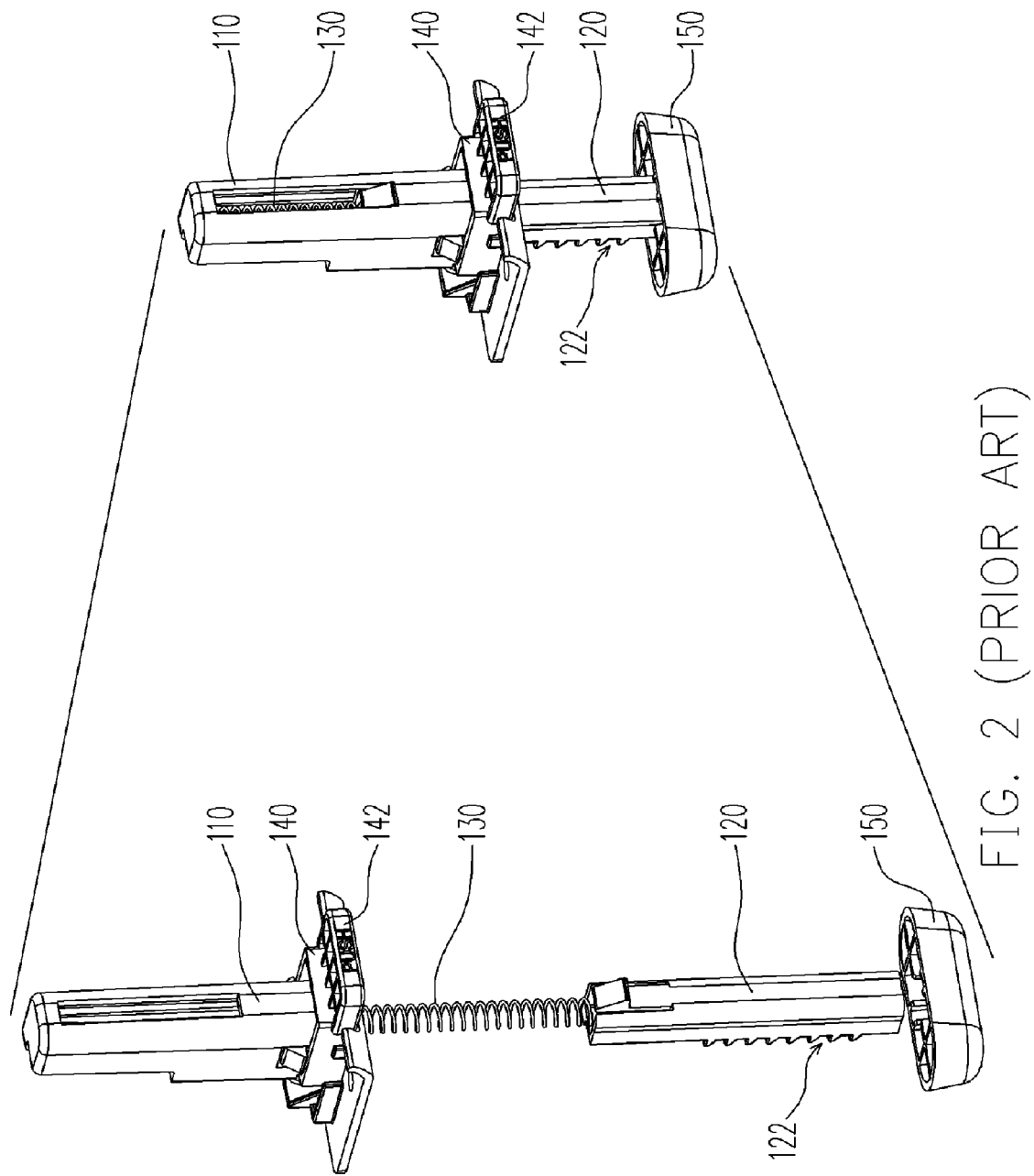
FIG. 2 is an explosion view of a conventional elevating module.

Reference is made in detail to the present preferred embodiments of the invention, examples of which are illustrated in the accompanying drawings. Wherever possible, the same reference numbers are used in the drawings and the description to refer to the same or like parts.

Figure 3:
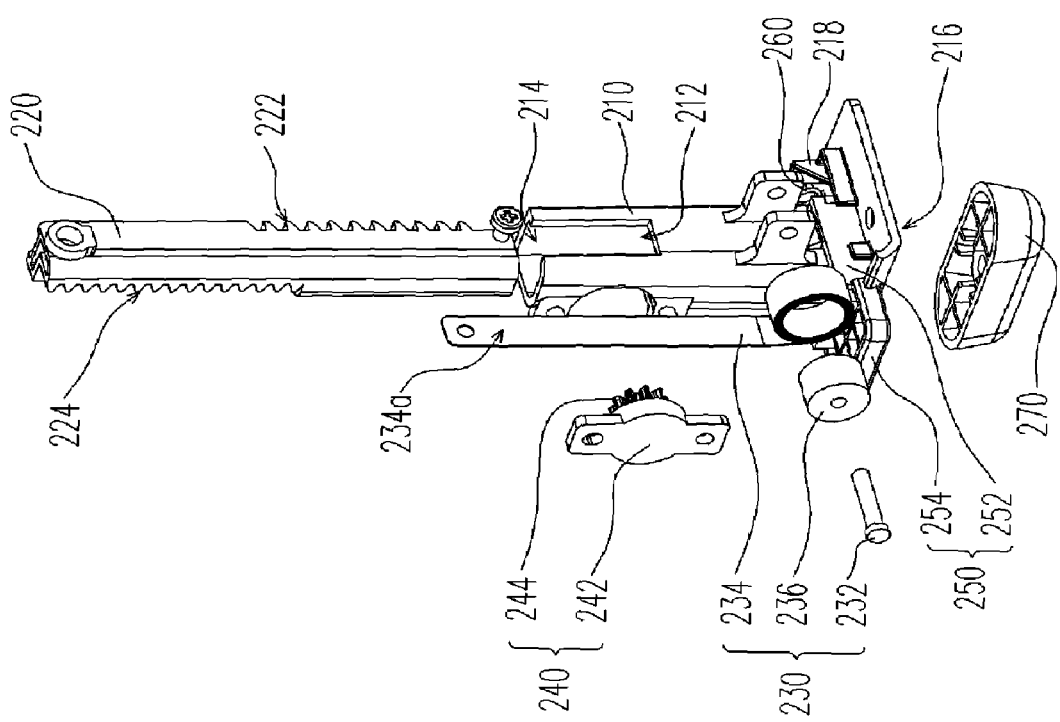
FIG. 3 is an explosion view showing an elevating module according to the present invention.

As shown in FIG. 3, an elevating module 200 of the present invention is applied to a projection apparatus (not shown). The elevating module 200 includes a base 210, a movable leg 220, a first elastomer 230, a decelerating module 240, a fixing component 250, and a pad 270. The base 210 is connected to the projection apparatus (not shown). The base 210 further includes a slide way 212, an accommodating space 214, and an opening 216. The opening 216 is disposed at one end of the base 210. The accommodating space 214 is disposed in the base 210 and connected to the opening 216. The slide way 212 is disposed on one sidewall of the base 210 and connected to the accommodating space 214.

The movable leg 220 penetrates the opening 216 of the base 210 and accommodates within the accommodating space 214. The first elastomer 230 is connected to the base 210 and the movable leg 220 such that the movable leg 220 protrudes from the opening 216 of the base 210 through the first elastomer 230. The decelerating module 240 is disposed on an upper end of the base 210 for controlling a speed of protruding the movable leg 220. Furthermore, the decelerating module 240 is contacted the movable leg 220 so that an impact between the movable leg 220 and the base 210 is prevented, and a noise and a wobbling can be reduced. The fixing component 250 fixes the base 210 onto the movable leg 220. The pad 270 is disposed on one end of the movable leg 220.

As shown in FIG. 3, in more detail, a gear rack 224 is disposed on one end of the movable leg 220. The decelerating module 240 has a fixed base 242 and a damper 244 disposed on the fixed base 242, for example. In one embodiment, the damper 244 is a damped gear, for example. In the present embodiment, the damper 244 engages with a gear rack 224 of the movable leg 220 to control the moving speed of the movable leg 220.

In addition, the first elastomer 230 includes a roller 236, a constant force spring 234 and a roller shaft 232, for example. A first end of the constant force spring 234 is connected to the movable leg 220 and a second end of the constant force spring 234 wraps around the roller 236. The roller 236 is pivotally connected to the base 210 through the roller shaft 232. A tension of the constant force spring 234 provides a pull greater than the torsion supplied by the damper 244, such as the damped gear. Furthermore, the constant force spring 234 is capable of providing an identical tension so that the movable leg 220 moves with a constant elevating/descending speed. In one embodiment, the constant force spring 230 is made of iron plate and the first end of the constant force spring 230 is fixed to the movable leg 220 through a screw, for example.

Figure 4B:
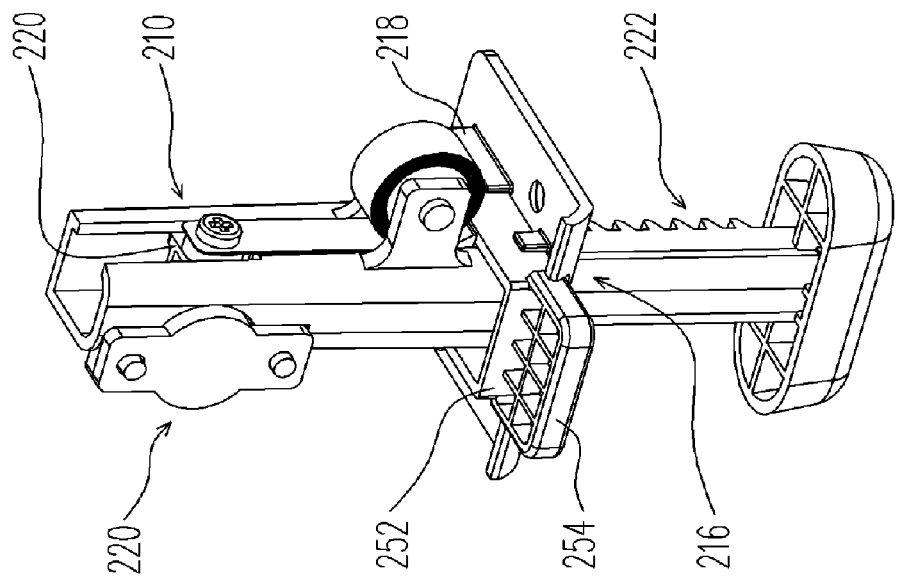
FIG. 4B is a diagram showing a movable leg of an elevating module protruded out from a base according to the present invention.
Figure 4A:
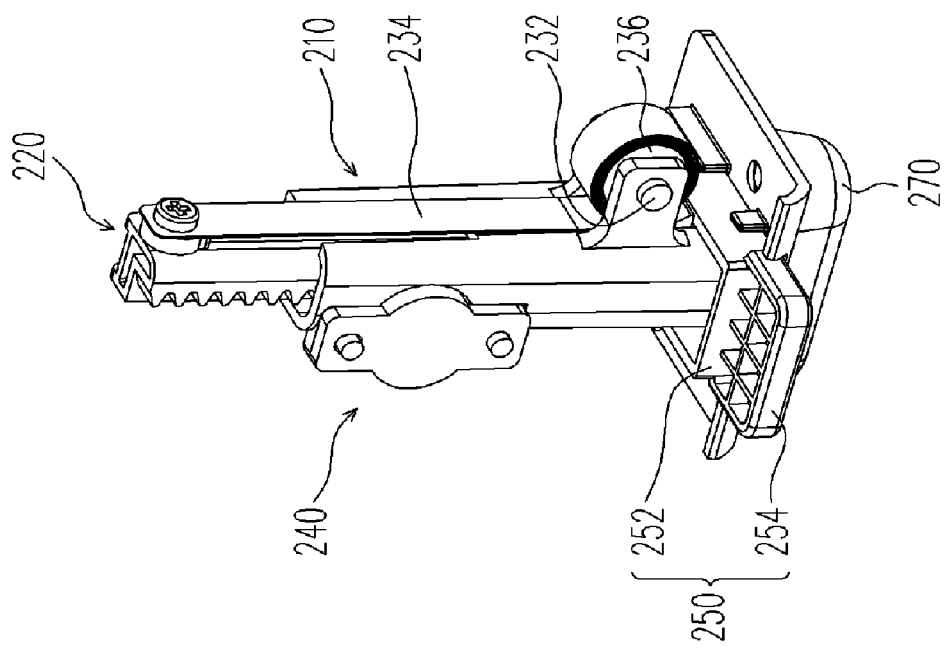
FIG. 4A is a diagram showing a movable leg of an elevating module retracted back into a base according to the present invention.

As shown in FIGS. 3 and 4A, before using the projection apparatus (not shown) or when a height level of the projection apparatus (not shown) needs no adjustment, the movable leg 220 is retracted into the base 210. The positioning section (not shown) of a frame 252 is inserted into one of the positioning grooves 222 of the movable leg 220 so that the movable leg 220 is fixed on the base 210.

As shown in FIGS. 3 and 4B, when a user presses the button 254, the positioning section (not shown) of the frame 252 detaches from the original positioning groove 222. Because a stopper plate 218 is fixed on the base 210, a second elastomer 260 is compressed by the frame 252 and stores up an elastic potential. In the meantime, the detaching the positioning section (not shown) of the frame 252 from the positioning groove 222 of the movable leg 220 and a contraction of the constant force spring 234 lead the movable leg 220 to move downward and protrude from the opening 216 of the base 210. When the movable leg 220 protrudes from the base 210, the damper 244 engages with and the gear rack 224 of the movable leg 220 to slow down the speed of the movable leg 220 so that the movable leg 220 can maintain a constant speed. Furthermore, an upper section of the movable leg 220 is firmly supported by the damper 244 and the constant force spring 234 to prevent any wobbling. In one embodiment, a damping coefficient of the damper 244 is adjustable for various movable legs protruding with different suitable speed.

When the movable leg 220 protrudes from the base 210 to a suitable location, the user releases the button 254 so that the elastic potential of the second elastomer 260 is also released. Then, the second elastomer 260 pushes the frame 252 so that the positioning section (not shown) of the frame 252 is inserted into one of the positioning grooves 222 of the movable leg 220 for fixing the movable leg 220 to the base 210. The user determines the length of extension of the movable leg 220 when the movable leg 220 slowly protrudes from the base 210 instead of adjusting after the movable leg 220 has fully protruded from the base 210.

In summary, the elevating module in the present invention includes at least the following advantages:

1. The disposition of the decelerating module and the first elastomer causes the movable leg to protrude from the base with the slow and stable protruding speed so that the impact between the movable leg and the base is avoided. Thus, less noise is produced and the user feels more comfortable during operating the elevating module.

2. By preventing the impact between the movable leg and the base, the elevating module is less readily damaged.

3. Since the movable leg protrudes from the base in a stable speed, the user easily sets up a correct extension of the movable leg for projecting an image from the projection apparatus to a suitable location on the screen.

4. The damper and gear rack engage inside the elevating module and permit the suitable protruding speed of the movable leg through adjusting the damping coefficient. Hence, the elevating module provides a high quality during operating.

It is apparent to those skilled in the art that various modifications and variations are made to the structure of the present invention without departing from the scope or spirit of the invention. In view of the foregoing, it is intended that the present invention covers modifications and variations of this invention provided they fall within the scope of the following claims and their equivalents.

What is claimed is:

1. An elevating module for a projection apparatus, comprising:

a base connected to the projection apparatus, the base having a slide way, an accommodating space and an opening disposed on one end of the base, the accommodating space disposed in the base and connected to the opening, and the slide way disposed on a sidewall of the base and connected to the accommodating space;

a movable leg penetrating the opening and accommodating within the accommodating space of the base;

a first elastomer connected to the base and the movable leg, the first elastomer for protruding the movable leg from the opening of the base;

a decelerating module disposed on the base, the decelerating module for contacting to the movable leg; and a fixing component disposed on the base for fixing the base to the movable leg.

2. The elevating module of claim 1, wherein the movable leg further comprises a gear rack disposed on one end of the movable leg.

3. The elevating module of claim 2, wherein the decelerating module further comprises:

a fixed base; and a damper disposed on the fixed base.

4. The elevating module of claim 3, wherein the damper comprises a damped gear.

5. The elevating module of claim 4, wherein the damped gear and the gear rack engage with each other for controlling an protruding speed of the movable leg.

6. The elevating module of claim 1, wherein the movable leg further comprises a plurality of positioning grooves, and the fixing component is for inserting into one of the positioning grooves.

7. The elevating module of claim 6, wherein the fixing component further comprises a frame disposed on the base and the frame has a positioning section for inserting into one of the positioning grooves.

8. The elevating module of claim 7, wherein the fixing component further comprises a button disposed on the frame.

9. The elevating module of claim 6, wherein the elevating module further comprises a second elastomer and the base further comprises a stopper plate, and the second elastomer is disposed between the stopper plate and the fixing component.

10. The elevating module of claim 9, wherein the second elastomer comprises a spring.

11. The elevating module of claim 1, wherein the first elastomer comprises:

a roller;

a constant force spring wrapped around the roller, the constant force spring having a first end and a second end, the first end connected to the movable leg and the second end connected to the base; and a roller shaft for pivotally connecting the roller to the base.

12. The elevating module of claim 1, wherein the elevating module further comprises a pad disposed to one end of the movable leg.

* * * * *